No. 885,638. PATENTED APR. 21, 1908.
J. J. NEWLANDS.
REEL CRANK.
APPLICATION FILED OCT. 14, 1907.

WITNESSES
Geo. W. Taylor
Walton Harrison

INVENTOR
John J. Newlands
BY Munn & Co
ATTORNEYS

UNITED STATES PATENT OFFICE.

JOHN JOSEPH NEWLANDS, OF NEW YORK, N. Y.

REEL-CRANK.

No. 885,638.  Specification of Letters Patent.  Patented April 21, 1908.

Application filed October 14, 1907. Serial No. 397,304.

*To all whom it may concern:*

Be it known that I, JOHN JOSEPH NEWLANDS, a citizen of the United States, and a resident of the city of New York, borough of Manhattan, in the county and State of New York, have invented a new and Improved Reel-Crank, of which the following is a full, clear, and exact description.

My invention relates to reel cranks, such as are used by fishermen, my more particular object being to provide improvements in the construction whereby the practical length of the hand crank of the reel is changed at will, and also improvements in the means whereby the hand crank may be locked in a predetermined extended position.

Reference is to be had to the accompanying drawings forming a part of this specification, in which similar characters of reference indicate corresponding parts in all the figures.

Figure 1:
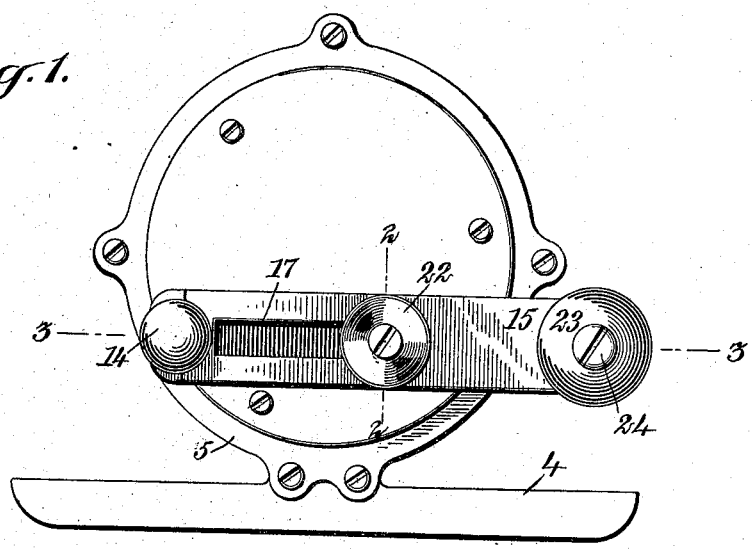
Figure 2:
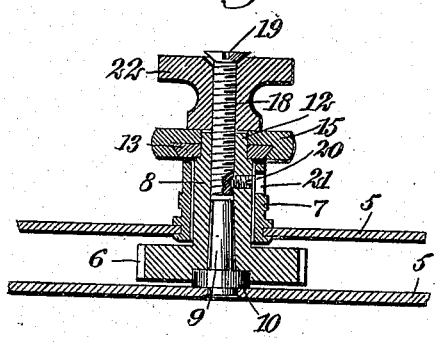
Figure 3:
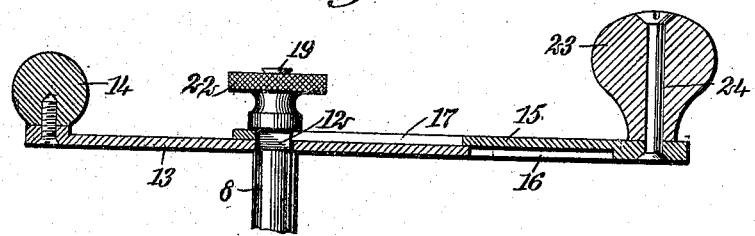

Figure 1 is a side elevation of my improved reel ready to be mounted upon a fishing rod, and showing the hand crank arranged so as to extend only to its shortest limit; Fig. 2 is a vertical section, on the line 2—2 of Fig. 1, through the hand lever and a gear wheel used for turning the reel; Fig. 3 is a section upon the line 3—3 of Fig. 1, this section being centrally through the extensible hand crank.

At 4 is shown a supporting bracket to be mounted upon a fishing rod and carried by this supporting bracket is a reel casing 5. A gear is shown at 6 for the purpose of manipulating the reel. This gear 6 together with the parts connected therewith and movable thereby, are so well known as to need no description.

A sleeve 7 is fixed upon the casing and mounted centrally within this sleeve is a revoluble sleeve 8 forming practically a part of the gear 6. Extending into this revoluble sleeve 8 is a post 9 provided with a disk 10 integral with it and serving as a bearing for both the gear 6 and the sleeve 8. The upper end of the revoluble sleeve 8 is provided with a square angular head 12. A flat bar 13 is provided with an aperture and fitted over the angular head 12. This bar 13 is provided at one of its ends with a knob 14, serving as a counter weight. A slide 15 fits over the rod 13 and is provided centrally with a longitudinal recess 16 into which the bar 13 makes a dovetail sliding fit. The slide 15 is provided with a slot 17 of sufficient width to enable the angular head 12 to extend through it. A threaded bolt 18 provided with a screw head 19 is fitted into the revoluble sleeve 8 and adapted to turn therewith. A set screw 20 extends through a portion of the revoluble sleeve 8 and rigidly engages the threaded bolt 18. In order to remove and replace the set screw 20 the sleeve 7 is provided with a hole 21 through which a screw driver may be inserted.

A milled thumb nut 22 is threaded internally and fitted upon the bolt 18. By turning this thumb nut it is loosened relatively to the slide 15 and bar 13. A knob 23 is secured by a bolt 24 upon one end of the slide 15. By pulling this knob straight out from the center, the slide 15 is moved outwardly, as indicated in Fig. 3. The thumb nut 22 being now tightened, the parts are held rigidly in this position.

My invention is used as follows: The reel being mounted upon a fishing rod, the operator sets the hand crank to any desired length within its proper limits, as above indicated. To do this he loosens the thumb nut 22 and pulls the knob 23 outward or pushes it inward as desired. He next tightens the nut 22 and this clamps the slide 15 rigidly in relation to the bar 13 and angular head 12. He now grasps the knob and turns it bodily around its center of rotation. The handle now is at a definite and predetermined distance from the angular head 12. If the operator so desires, he can leave the thumb nut 22 loose, and by grasping the knob 23, he may turn the hand crank and then, without touching the thumb nut 22, may lengthen or shorten the leverage exerted by the hand crank upon the reel, or in other words, may change the length of the hand crank while in the act of winding.

Having thus described my invention, I claim as new and desire to secure by Letters Patent:

1. In a hand crank for reels or the like, the combination of a casing provided with a fixed sleeve rigid in relation thereto, a revoluble sleeve mounted within said fixed sleeve and provided with a gear member to be turned, said revoluble sleeve being further provided with an angular head, a bar provided with an aperture through which said head extends, a slide provided with an aperture through which said head extends, said slide being movable in the general direction of its length relatively to said bar, means for temporarily clamping said slide relatively to said bar, and a knob mounted upon said slide for the purpose of turning said slide and said bar.

2. The combination of a casing, a sleeve mounted rigidly thereupon and provided with an aperture, a revoluble sleeve mounted within said fixed sleeve and provided with a gear member for operating a reel or the like, a bolt fitting into said revoluble sleeve, a fastening member for securing said bolt and said revoluble sleeve rigidly together so as to enable said bolt to turn, said fastening member being so disposed relatively to said revoluble sleeve as to be brought into registry with said aperture of said fixed sleeve, a hand crank mounted upon said revoluble sleeve and made in a plurality of pieces movable relatively to each other, said bolt extending through said pieces, and a threaded thumb nut revolubly mounted upon said bolt for the purpose of clamping said pieces temporarily together.

In testimony whereof I have signed my name to this specification in the presence of two subscribing witnesses.

JOHN JOSEPH NEWLANDS.

Witnesses:
WILLIAM OCHSE,
MAX AUERBACH.